April 24, 1951 F. G. ZAGAR 2,550,649
CONTROL MECHANISM FOR HYDRAULIC CUTTER OPERATING AND
CARRIAGE SHIFTING MOTORS OF MACHINE TOOLS
Filed March 26, 1947 3 Sheets-Sheet 1

INVENTOR
Frank G. Zagar
BY
Evans & McCoy
ATTORNEYS

Patented Apr. 24, 1951

2,550,649

UNITED STATES PATENT OFFICE 2,550,649

CONTROL MECHANISM FOR HYDRAULIC CUTTER OPERATING AND CARRIAGE SHIFTING MOTORS OF MACHINE TOOLS

Frank G. Zagar, Euclid, Ohio, assignor to Zagar Tool, Inc., Cleveland, Ohio, a corporation of Ohio Application March 26, 1947, Serial No. 737,382

22 Claims. (Cl. 77—33.6)

This invention relates to hydraulically operated machine tools, and more particularly to a control mechanism for cutter operating and carriage shifting motors.

The invention has for an object to provide a simple and efficient means for controlling hydraulic cutter driving and carriage feeding motors to provide relatively fast movement of the carriage up to cutting position, and a relatively slow feed movement thereof during the cutting operation.

A further object of the invention is to provide a hydraulic control by which the cutter driving motor is operated only after the work has been brought to cutting position.

A further object is to provide a hydraulic control mechanism which enables the carriage shifting motor to be stopped in any desired position and held stationary while the spindle driving motor is operated either forwardly or rearwardly to facilitate the coupling of cutting elements such as drill bits to the spindles, or the removal of drill bits from the spindles.

Further objects of the invention are to provide means for retarding the flow of liquid from a carriage operating cylinder to create a back pressure to prevent jumping of the carriage upon breakthrough of the cutting means, to provide a control system in which the entire cycle is controlled by a single operating lever, and to provide a control for limiting the pressure that can be exerted upon the carriage in its feed direction so that the feed will stop before excessive pressure is developed between the work and cutting means.

With the above and other objects in view, the invention may be said to comprise the mechanism as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
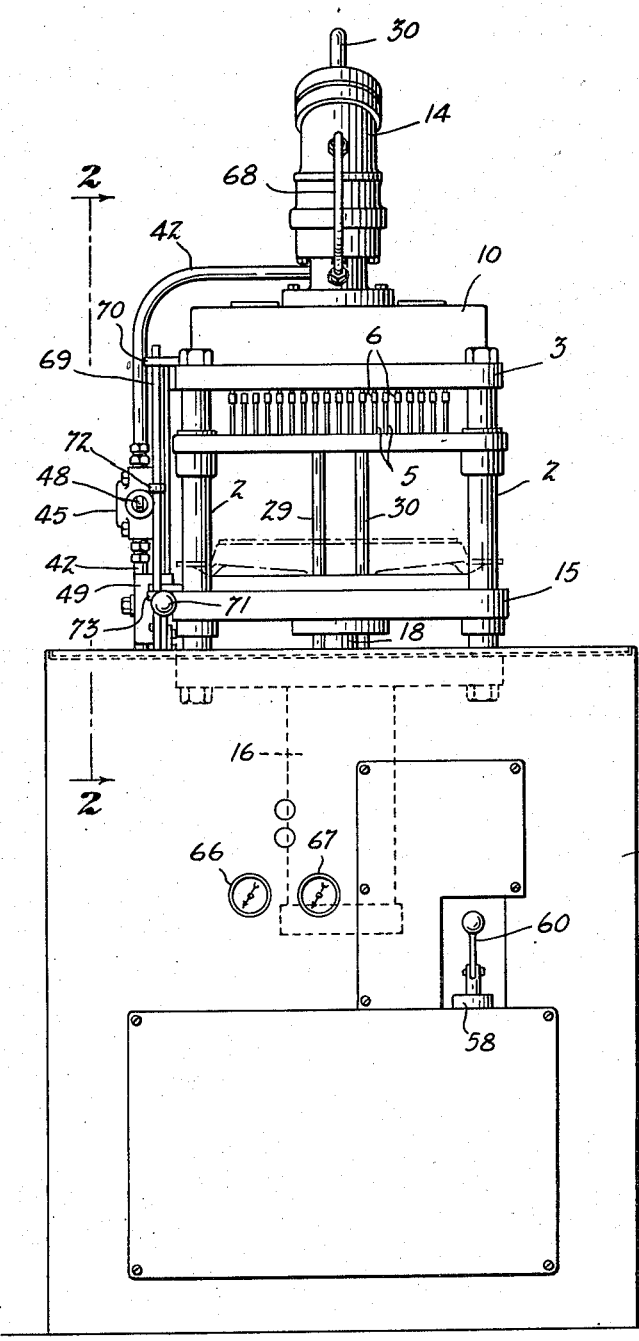
Figure 1 is a front elevation of a drill press to which the invention is applied.
Figure 2:
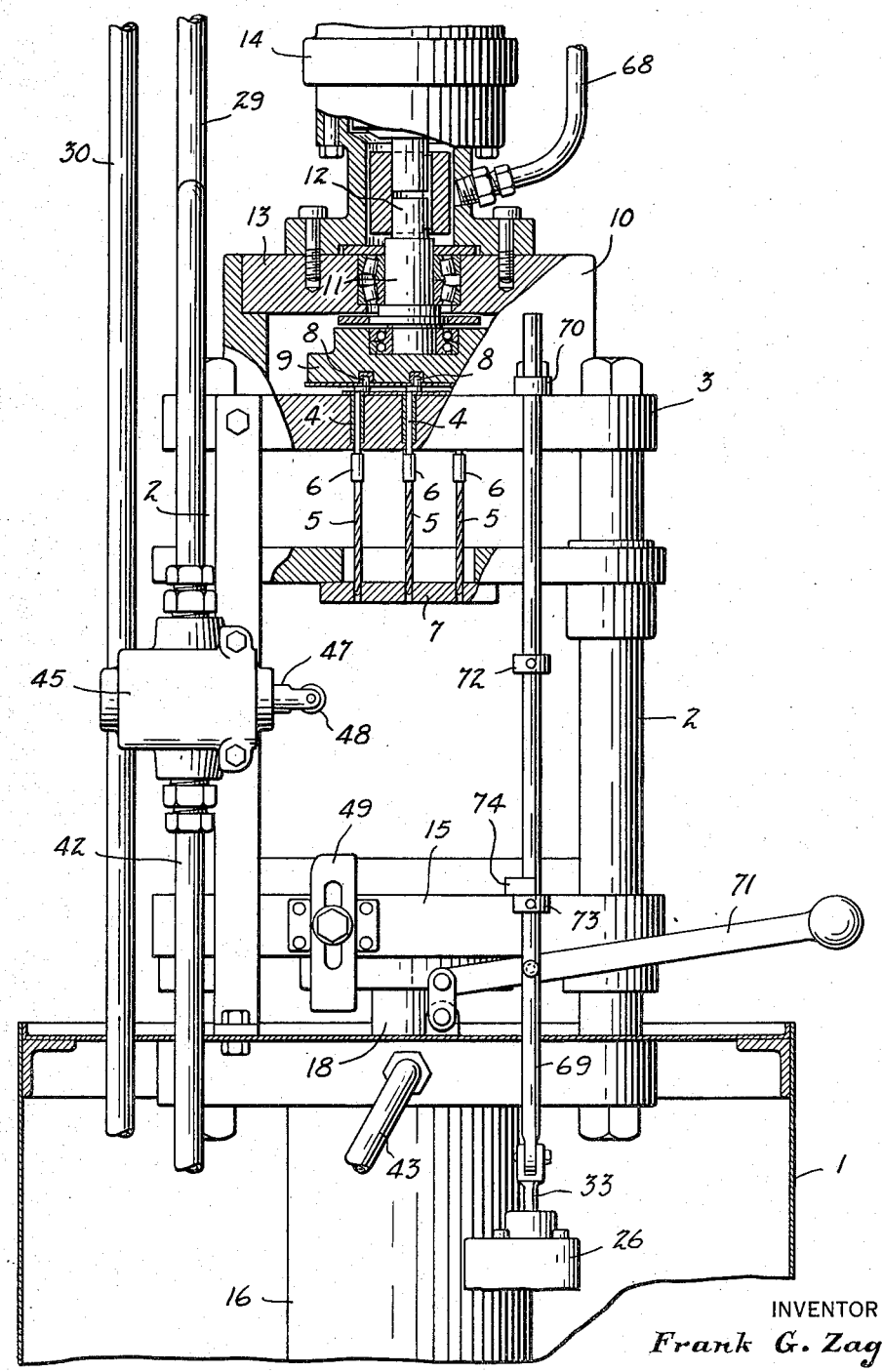
Fig. 2 is a fragmentary side elevation taken as indicated at 2—2 in Fig. 1, a portion of the spindle carrying head being broken away and shown in central vertical section.

In the accompanying drawings the invention is shown applied to a drill press of the multiple spindle type having a stationary spindle carrying head and a vertically movable work support. As shown in the accompanying drawings, the frame of the press has a lower housing portion 1 from the top of which four vertical posts 2 project. To the upper ends of the posts 2 there is attached a horizontally disposed plate 3 in which a series of vertical spindles 4 are journaled. Bits 5 are secured to the lower ends of the spindles 4 by suitable threaded couplings 6, the bits 5 being preferably guided by means of a plate 7 secured to the posts 2 below the plate 3 and provided with openings to receive the individual bits.

Each spindle 4 is provided with a crank 8 at its upper end and the cranks 8 are journaled in an oscillator plate 9 mounted within a housing 10 mounted upon the top of the plate 3. The oscillator plate is operated by means of a crank 11 upon the lower end of a vertical operating shaft 12 that is journaled in a top plate 13 in the housing 10, the shaft 12 being attached to the rotor of a reversible hydraulic motor 14 mounted upon the top of the housing 10. Beneath the housing 10 and guide plates 7 a vertically movable work carriage 15 is slidably mounted upon the posts 2. The work carriage 15 is operated by means of a hydraulic motor which comprises a vertically disposed cylinder 16 and a piston 17 having an upwardly extending rod 18 attached to the carriage 15.

Figure 3:
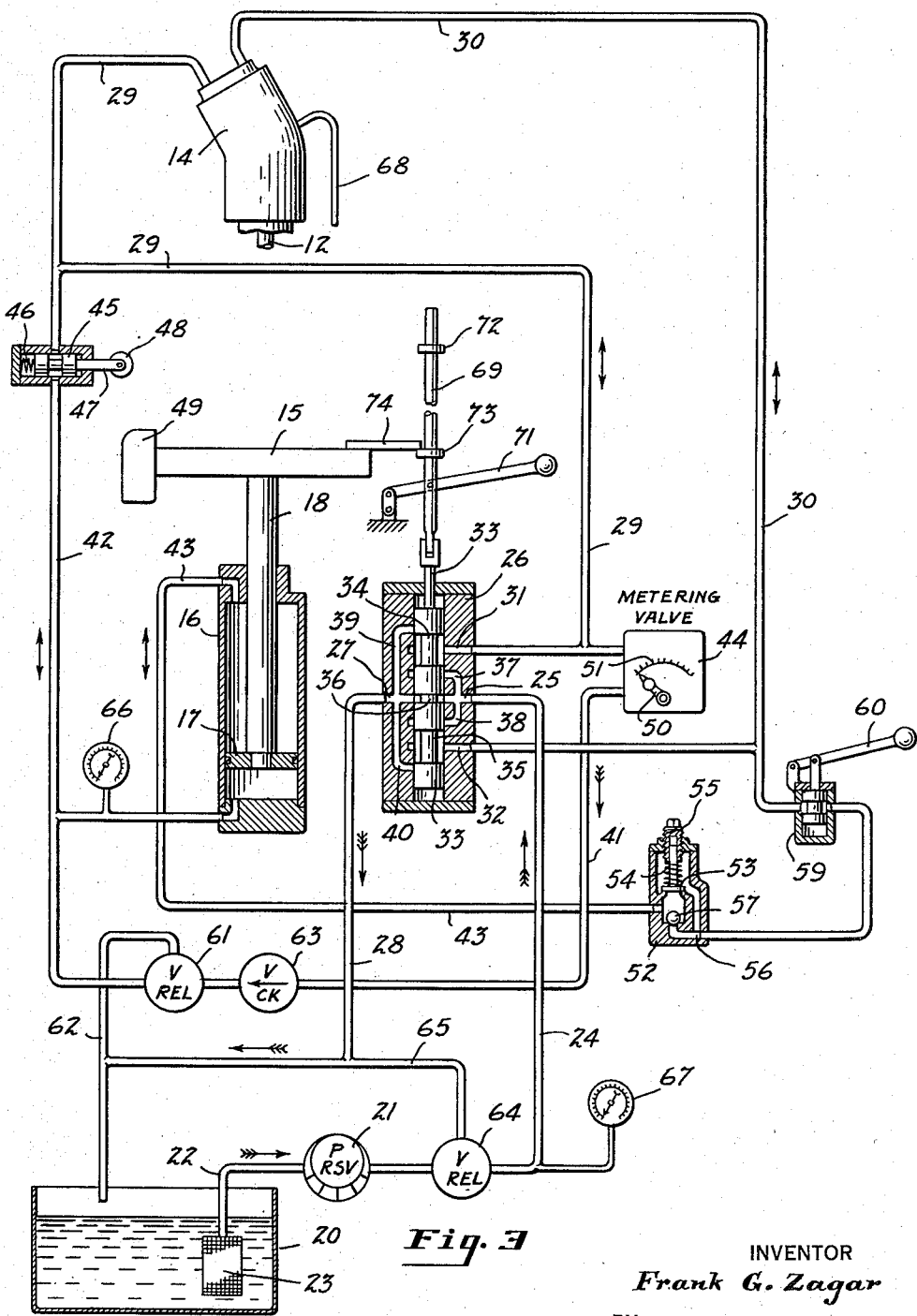
Fig. 3 is a diagrammatic view showing the hydraulic control circuit.

As shown in Fig. 3, a liquid reservoir 20 is provided from which liquid under pressure is delivered to the spindle driving and carriage shifting motors by means of a suitable pump 21. The inlet of the pump 21 is connected to the reservoir 20 by means of a conduit 22, the liquid being drawn through a suitable filter 23 into the conduit 22. Liquid under pressure is delivered from the pump 21 through a conduit 24 to the inlet port 25 of a four-way valve casing 26. Directly opposite the inlet port 25, the casing 26 is provided with an exhaust port 27 to which is connected a conduit 28 through which liquid is returned to the reservoir.

Two main conduits 29 and 30 are connected to the terminals of the hydraulic motor 14 and to ports 31 and 32 in the casing 26 above and below the inlet port 25. The valve casing 26 has a sliding valve member 33 mounted therein and this valve member is provided with an upper circumferential groove 34, a lower circumferential groove 35 and an intermediate circumferential groove 36. The valve casing 26 is provided with branch passages 37 and 38 extending upwardly and downwardly from the inlet port 25 and communicating with the bore in which the sliding valve member 33 is mounted. Similar branch passages 39 and 40 extend upwardly and downwardly from the exhaust port 27. When the valve member 33 is in its neutral position as shown in Fig. 3, the intermediate groove 36 thereof is alined with the inlet and exhaust ports 25 and 27 so that the liquid flows freely through the valve to the return pipe 28. When the valve member 33 is moved downwardly from its neutral position, the groove 36 is moved out of registry with the ports 25 and 27 and the pressure port 26 is placed in communication with the main conduit 29 through the branch passage 37 and groove 34. At the same time, the second main conduit 30 is connected to the exhaust port 27 and return conduit 28 through the lower groove 35 of the valve member and the branch passage 40 in the valve casing. When the valve member 33 is moved upwardly from its neutral position the main conduit 30 is connected to the pressure conduit 24 through the lower groove 35 of the valve member 33 and the branch passage 39 in the valve casing, and the main conduit 29 is connected to the return conduit 28 through the upper groove 34 of the valve member and the branch passage 39 in the valve casing. The valve member 33 is thus movable from a neutral position downwardly to operate the motor 14 in a forward direction, or upwardly to operate the motor 14 in reverse direction.

The main conduits 29 and 30 also serve as pressure and exhaust lines for the cylinder 16. The main conduit 29 is connected to the lower end of the cylinder 16 by means of two branch conduits 41 and 42 and the upper end of the cylinder 16 is connected to the main conduit 30 through a third branch conduit 43. Flow through the branch conduit 41 to the lower end of the cylinder 16 is controlled by means of a constant flow control or metering valve 44. The metering valve 44 is a valve of conventional construction designed to permit passage of liquid at a constant rate regardless of the pressure imposed thereon and serves to bleed liquid from the conduit 29 at a relatively slow rate to the lower end of the cylinder 16 to impart a slow feed movement to the work carriage.

The branch conduit 42 has a cutoff valve 45 therein which is normally held in open position by means of a spring 46. The valve 45 has a stem 47 carrying a roller 48 that is engaged by a cam 49 adjustably secured to the work carriage 15 to close the valve 45 at a predetermined point in the upward movement of the work carriage to cut off flow through the conduit 42 to the lower end of the cylinder 16 and to establish a slow flow through the flow control valve 44 to the cylinder.

The hydraulic motor 14 requires a substantial initial pressure for operation and the area of the lower face of the piston 17 is such that substantially less pressure than that required to operate the motor 14 is required to shift the work carriage. When the valve 45 is closed by means of the cam 49, the only liquid delivered to the lower end of the cylinder 16 is that which is passed by the metering valve 44. The flow retarding action of the metering valve 44 causes pressure to be built up in the conduit 29 and this pressure diverted to the motor 14 operates the motor to drive the spindles 4, and by proper adjustment of the cam 49 the spindles may be brought up to full speed just prior to engagement of the bits with the work.

The cam 49, as shown in Fig. 1, is mounted for vertical adjustment on the carriage 15, so that the valve 45 may be closed at the desired point in the upward travel of the carriage and the cam 49 is so formed that the valve 45 is held in closed position during the final feed movement of the carriage. In order to regulate the rate of feed movement, the flow control valve 44 is adjustable to vary the rate of flow of liquid to the cylinder 16 by means of a lever 50 in the form of a pointer which moves over a graduated scale 51 on the casing of the valve 44.

When the bits 5 break through the work, there is a sudden decrease in the resistance to the movement of the carriage 15 which tends to cause the carriage to jump. To counteract this tendency a valve unit 52 is provided in the conduit 43 in which is mounted a valve 53 which is normally held closed by means of a spring 54. The valve 53 is positioned to be opened by the pressure of liquid flowing from the cylinder 16 and the tension of the spring 54 may be adjusted by means of a suitable adjusting nut 55 to provide the desired amount of back pressure in the cylinder 16.

The valve unit 52 is provided with a passage 56 which bypasses the valve 53 and the passage 56 is controlled by a check valve 57 which is held closed by pressure exerted in a direction to open the valve 53 but which permits free flow of liquid toward the cylinder 16. By means of the passage 56 and check valve 57, the flow retarding valve 53 is bypassed when the pressure connections are reversed to shift the work carriage downwardly.

The branch conduit 43 is also provided with a cutoff valve 59 that can be moved manually to either open or closed position by suitable means such as a lever 60. When the valve 59 is closed, flow of liquid to or from the cylinder 16 is prevented and the work table may be held against movement in any desired position. With the valve 59 closed, the spindle driving motor 14 may be operated either in a forward or a reverse direction under the control of the valve member 33. This independent operation of the spindle driving motor facilitates the attachment or removal of the bits 5 to the spindles 4. When the bits 5 are held by means of pincers and the motor is driven in a reverse direction, the bits are detached from the couplings 6 and the bits may be threaded into the couplings 6 by holding them in engagement with the couplings while the spindles are driven in a forward direction.

A relief valve 61 is preferably provided in the branch conduit 41 between the flow control valve 44 and the lower end of the cylinder 16 to limit the pressure that can be exerted upon the work carriage, so that when an excessive pressure is exerted upon the drill bits due to dullness of the bits, the carriage will be stopped, preventing damage to the work or the drill spindles. A drain conduit 62 connects the relief valve 61 to the reservoir 20 to return any liquid discharged through the relief valve to the reservoir 20. A check valve 63 is provided between the valve 61 and the flow control valve 44 to prevent reverse pressure on the control valve.

When the pressure on the piston 17 is reversed to lower the work carriage from a position in which the cam 49 engages the valve 45 to hold it in closed position, the initial downward movement of the work carriage is retarded by means of the relief valve 61 through which the liquid from the lower end of the cylinder is forced. As soon as the cam 49 is moved downwardly far enough to release the valve 45, a free flow is established from the lower end of the cylinder 16 through the branch conduit 42 to the conduit 29 which is then in communication with the return conduit 28. When the carriage is being returned from its uppermost position, liquid is initially forced through the relief valve 61 and drain conduit 62 to the liquid reservoir, causing a slow downward movement of the carriage until the work is freed from the drill bits, after which the valve 45 is opened and rapid downward movement is imparted to the carriage.

In order to protect the pump 21, a relief valve 64 is preferably provided in the conduit 24 between the pump and control valve, liquid being drained from the relief valve 64 to the reservoir 20 through a conduit 65. Gauges 66 and 67 are preferably provided to indicate the pressure in the conduit 24 and in the lower end of the cylinder 16.

In order to effectively lubricate the spindle bearings and spindle operating mechanism, a branch conduit 68 is provided from the motor 14 to the housing 10 to deliver a portion of the oil from the motor for the lubrication of the spindles.

The main control valve member 33 is pivotally connected at its upper end to a vertically disposed rod 69 slidably mounted in a guide 70 carried by the plate 3, and may be operated manually by means of a lever 71 pivoted at its inner end to the frame and intermediate its ends to the rod 69. Vertically spaced collars 72 and 73 are attached to the rod 69 and these collars are positioned in the path of a trip arm 74 carried by the work carriage 15. The valve member 33 can be moved upwardly or downwardly from its neutral position by means of the manually operable lever 71 to connect either of the main conduits 29 and 30 to the pressure conduit 24 and the other of the main conduits to the return conduit 28, so that the pressure connections to the spindle driving and work shifting motors can be reversed, or both motors stopped by means of a lever 71.

The trip arm 74 carried by the work carriage 15 serves to automatically shift the valve member 33 to neutral position upon completion of the upward or downward stroke of the work carriage. After the valve member 33 has been shifted to neutral position by the work carriage at the upper end of its stroke, the lever 71 can be operated at any time to shift the valve member upwardly to impart a downward movement to the carriage. After the valve member 33 has been shifted by the work carriage 15 to neutral position at the lowermost position of the carriage, the lever 71 may be operated to lower the valve member 33 and impart an upward movement to the work carriage.

It is to be understood that variations and modifications of the specific devices herein shown and described for purposes of illustration, may be made without departing from the spirit of the invention.

What I claim is:

1. A hydraulic operating mechanism for a machine tool comprising a hydraulic spindle driving motor requiring a substantial line pressure for operation, a hydraulic carriage shifting motor operable at a pressure less than that required to start said spindle driving motor, a liquid reservoir, a pump for delivering liquid from said reservoir, a conduit receiving fluid under pressure from said pump and connected to said driving motor, two passages connecting said conduit to said shifting motor, one of said passages being normally open and the other having an adjustable constant rate flow control valve, and a carriage operated valve for closing said normally open passage, whereby pressure is diverted to the spindle driving motor to start the same and said shifting motor is operated at a lower feeding speed under control of said flow control valve.

2. A hydraulic operating mechanism for a machine tool comprising a hydraulic spindle driving motor requiring a substantial line pressure for operation, a hydraulic carriage shifting motor comprising a cylinder and a piston having a pressure receiving area such that it is movable to shift the carriage at a line pressure less than that required to start the driving motor, a conduit connected to the spindle driving motor, a pump for delivering liquid under pressure to said conduit, two passages connecting said conduit to said cylinder, one of said passages being normally open and the other having a constant rate flow control valve therein, and a carriage operated valve for closing said normally open passage, whereby pressure is diverted to the spindle driving motor to start the same and relatively slow feed movement is imparted to the carriage.

3. In a machine of the character described having cutting means and a shiftable carriage for causing a relative feed movement between the work and cutting means, a cylinder and piston for operating said carriage, a pump, a conduit for receiving liquid under pressure from said pump and connected to said cylinder to actuate said carriage to feed the work to said cutting means, an adjustable constant rate flow control valve controlling the rate of delivery of liquid from said conduit to said cylinder and the speed of said piston, an adjustable relief valve between said flow control valve and cylinder to limit the pressure of the work against said cutting means, and a retarding valve controlling discharge from said cylinder to maintain back pressure on said piston to prevent jumping of the carriage upon breakthrough of the cutting means.

4. In a machine of the character described having cutting means and a shiftable carriage for causing a relative feed movement between the work and cutting means, a cylinder and piston for operating said carriage, a pump, valve controlled means for delivering pressure from the pump to either end of said cylinder for moving said carriage in either direction, an adjustable constant rate flow control valve controlling flow of liquid to one end of said cylinder to move the carriage in a direction to feed the work to said cutting means, an adjustable flow retarding valve controlling discharge of liquid from the opposite end of said cylinder, and check valve controlled passages for bypassing said flow control and retarding valves when said valve controlled means is set to deliver pressure to the opposite end of the cylinder.

5. A hydraulic operating mechanism for machine tools comprising a spindle driving motor and a carriage shifting motor, each a reversible hydraulic motor having two ports through which liquid flow may be reversed, two main conduits connected, one to each port of said driving motor, a source of liquid under pressure, a control valve mechanism operable to connect said main conduits to and disconnect the same from said source and to reverse the flow of liquid through said conduits, two branch conduits connecting one of said main conduits to one port of said shifting motor, a third branch conduit for connecting the other port of said shifting motor to the other of said main conduits, an adjustable uniform rate flow control valve in one of said two branch conduits, a valve for opening and closing the other of said two branch conduits, and a valve for opening and closing said third branch passage to control operation of said carriage shifting motor independently of the spindle driving motor.

6. A hydraulic operating mechanism for machine tools comprising a spindle driving motor and a carriage shifting motor, each a reversible hydraulic motor having two ports through which liquid flow may be reversed, two main conduits connected, one to each port of said driving motor, a source of liquid under pressure, a control valve mechanism operable to connect said main conduits to and disconnect the same from said source and to reverse the flow of liquid through said conduits, two branch conduits connecting one of said main conduits to one port of said shifting motor, a third branch conduit for connecting the other port of said shifting motor to the other of said main conduits, an adjustable uniform rate flow control valve in one of said two branch conduits, a valve for opening and closing the other of said two branch conduits, motor operated means for actuating said valve mechanism to disconnect said main conduits from said pressure source to stop the motors and limit the movement of the shifting motor in each direction, and a valve for closing said third branch passage to stop said shifting motor in intermediate positions independently of the driving motor.

7. A hydraulic operating mechanism for machine tools comprising a spindle driving motor and a carriage shifting motor, each a reversible hydraulic motor having two ports through which liquid flow may be reversed, two main conduits connected, one to each port of said driving motor, a source of liquid under pressure, a control valve mechanism operable to connect said main conduits to and disconnect the same from said source and to reverse the flow of liquid through said conduits, two branch conduits connecting one of said main conduits to one port of said shifting motor, a third branch conduit for connecting the other port of said shifting motor to the other of said main conduits, an adjustable uniform rate flow control valve in one of said two branch conduits, a normally open cut-off valve in the other of said two branch conduits, motor operated means for closing said cut-off valve at a predetermined point in the movement of the shifting motor, motor operated means for actuating said valve mechanism to disconnect said main conduits from the pressure source to stop the motors and limit the movement of the shifting motor in each direction, and a valve for closing said third branch passage to stop said shifting motor in intermediate positions independently of the driving motor.

8. A hydraulic operating mechanism for machine tools comprising a reversible carriage shifting hydraulic motor having two ports through which liquid flow may be reversed, two main conduits connected, one to each port of said driving motor, a source of liquid under pressure, a control valve mechanism operable to connect said main conduits to and disconnect the same from said source and to reverse the flow of liquid through said conduits, two branch conduits connecting one of said main conduits to one port of said shifting motor, a third branch conduit for connecting the other port of said shifting motor to the other of said main conduits, an adjustable uniform rate flow control valve in one of said two branch conduits, a normally open cut-off valve in the other of said two branch conduits, means operated by said motor for closing said cut-off valve at a predetermined point in the movement of the shifting motor, means operated by said motor for actuating said valve mechanism to disconnect said main conduits from the pressure source to stop the motor and limit the movement of the same in each direction, pressure operated valves in said third branch conduit for retarding flow away from the shifting motor and permitting free flow through said third branch conduit to said shifting motor, and check valve controlled means for bypassing said flow control valve upon reversal of said motor.

9. A hydraulic operating mechanism for machine tools comprising a spindle driving motor and a carriage shifting motor, each a reversible hydraulic motor having two ports through which liquid flow may be reversed, two main conduits connected, one to each port of said driving motor, a source of liquid under pressure, a control valve mechanism operable to connect said main conduits to and disconnect the same from said source and to reverse the flow of liquid through said conduits, two branch conduits connecting one of said main conduits to one port of said shifting motor, a third branch conduit for connecting the other port of said shifting motor to the other of said main conduits, an adjustable uniform rate flow control valve in one of said two branch conduits, a normally open cut-off valve in the other of said two branch conduits, motor operated means for closing said cut-off valve at a predetermined point in the movement of the shifting motor, motor operated means for actuating said valve mechanism to disconnect said main conduits from the pressure source to stop the motors and limit the movement of the shifting motor in each direction, a pressure operated retarding valve in said third branch conduit for creating a back pressure in said shifting motor, check valve controlled means for bypassing said flow control and retarding valves upon reversal of said motors, and a valve for opening and closing said third branch passage to control operation of the shifting motor independently of the driving motor.

10. A hydraulic operating mechanism for machine tools comprising a spindle driving motor and a carriage shifting motor, each a reversible hydraulic motor having two ports through which liquid flow may be reversed, two main conduits connected, one to each port of said driving motor, a source of liquid under pressure, a valve casing connected to said conduits, said casing having an exhaust port and an inlet port connected to said pressure source, a valve member in said casing movable in two directions from a neutral position to connect either of said main conduits with said pressure source and the other main conduit to said exhaust port, two branch conduits connecting one of said main conduits to one port of said shifting motor, a third branch conduit connecting the other port of said shifting motor to the other of said main conduits, a normally open cut-off valve in one of said two branch conduits, an adjustable constant rate flow control valve in the other of said two branch conduits, manually operable means for shifting said valve member to operate the motors in either direction or to stop the same, motor operated means for shifting said valve member to neutral position to limit the movement of the shifting motor in each direction, motor operated means for closing said cut-off valve and holding the same closed during a portion of the movement of said shifting motor whereby the speed of said shifting motor is regulated during said portion of the movement thereof, a valve in said third branch conduit to retard flow from said shifting motor, a manually operable valve in said third branch conduit for opening or closing said third branch conduit to control operation of said shifting motor independently of said driving motor, and check valve controlled means for bypassing said flow control and flow retarding valves upon reverse operation of said motors.

11. A hydraulic operating mechanism for machine tools comprising a carriage shifting motor in the form of a cylinder and piston, two main conduits, a source of liquid under pressure, a control valve mechanism operable to connect either of said conduits to or disconnect the same from said source and to reverse the flow of liquid through said conduits, two branch conduits connecting one of said main conduits to one end of said cylinder, a third branch conduit connecting the opposite end of said cylinder to the other branch conduit, a normally open cut-off valve in one of said two branch conduits, means movable with said piston to close said cut-off valve and hold the same closed during a portion of the movement of the piston, and a uniform rate flow control valve in the other of said two branch conduits to control the speed of said piston while said cut-off valve is closed.

12. A hydraulic operating mechanism for machine tools comprising a carriage shifting motor in the form of a cylinder and piston, two main conduits, a source of liquid under pressure, a control valve mechanism operable to connect either of said conduits to or disconnect the same from said source and to reverse the flow of liquid through said conduits, two branch conduits connecting one of said main conduits to one end of said cylinder, a third branch conduit connecting the opposite end of said cylinder to the other branch conduit, a normally open cut-off valve in one of said two branch conduits, means movable with said piston to close said cut-off valve and hold the same closed during a portion of the movement of the piston, a uniform rate flow control valve in the other of said two branch conduits to control the speed of said piston while said cut-off valve is closed, an adjustable flow retarding valve in said third branch conduit for creating a back pressure on said piston, and check valve controlled means for by-passing said flow control and retarding valve upon reverse operation of said shifting motor.

13. A hydraulic operating mechanism for machine tools comprising a carriage shifting motor in the form of a cylinder and piston, two main conduits, a source of liquid under pressure, a control valve mechanism operable to connect either of said conduits to or disconnect the same from said source and to reverse the flow of liquid through said conduits, two branch conduits connecting one of said main conduits to one end of said cylinder, a third branch conduit connecting the opposite end of said cylinder to the other branch conduit, a normally open cut-off valve in one of said two branch conduits, means movable with said piston to close said cut-off valve and hold the same closed during a portion of the movement of the piston, a uniform rate flow control valve in the other of said two branch conduits to control the speed of said piston while said cut-off valve is closed, a valve unit in said third branch conduit comprising an adjustable flow retarding valve for creating back pressure on said piston, a check valve controlled passage bypassing said flow retarding valve to permit free flow through said third branch conduit to said cylinder, a check valve between said flow control valve and cylinder for preventing reverse flow through said flow control valve, and a relief valve between said check valve and said cylinder.

14. In a machine tool having relatively movable members, one a work support and the other a spindle carrying head, a reversible hydraulic spindle driving motor having two ports through which liquid flow may be reversed, a reversible hydraulic motor having two ports through which liquid flow may be reversed for shifting one of said members relative to the other, a liquid reservoir, a pump for delivering liquid from said reservoir, a valve casing pressure and exhaust conduits connecting said pump to said casing and said casing to said reservoir, two main conduits connecting said casing to the ports of said spindle driving motor, a manually operable control valve in said casing movable in two directions from a neutral position to connect either of said main conduits to said pressure conduit and the other of the main conduits to the exhaust conduit to operate the driving motor in either direction, two branch conduits connecting one of the main conduits to one of the ports of the shifting motor, a third branch conduit connecting the other port of the shifting motor to the other of the main conduits, a normally open cut-off valve in one of said two branch conduits, an adjustable flow control valve in the other of said two branch conduits, means operated by said shifting motor for closing said cut-off valve and holding the same closed during a relative movement of said members, and a manually operable cut-off valve in said third branch conduit for stopping said shifting motor independently of said driving motor.

15. In a machine tool having relatively movable members, one a work support and the other a spindle carrying head, an actuating motor comprising a cylinder and piston for moving one of said members relative to the other, a liquid reservoir, a pump for delivering liquid from said reservoir, a valve casing, pressure and exhaust conduits connecting said pump to the valve casing and the valve casing to the reservoir, two main conduits, a main control valve in said casing movable in two directions from a neutral position to connect either of said main conduits to said pressure conduit and the other of the main conduits to the exhaust conduit, a manually operable actuator for said valve, piston operated means for shifting said main control valve to neutral position at each end of the stroke of said piston, two branch conduits connecting one end of said cylinder to one of said main conduits, a third branch conduit connecting the other end of said cylinder to the other of said main conduits, a normally open cut-off valve in one of said two branch conduits, a constant rate flow control valve in the other of said two branch conduits, piston operated means for closing said cut-off valve at an intermediate point in the movement of the piston, whereby the rate of the subsequent movement of the piston is controlled by said flow control valve, a pressure operated valve in said third branch conduit for retarding flow from said cylinder, and a check valve controlled bypass for permitting free flow through said third branch conduit toward said cylinder.

16. In a drill press having a spindle carrying member and a work supporting member mounted for relative movement, one toward and away from the other, a motor comprising a cylinder and piston for shifting one of said members, a liquid reservoir, a pump for delivering liquid from said reservoir, a valve casing having an inlet connected to said pump and an outlet connected to said reservoir, two main conduits, a shiftable valve member in said casing movable in two directions from a neutral position in which said inlet and said outlet are connected to positions connecting either of said main conduits to said inlet and the other of said main conduits to said outlet, two branch conduits connecting one of said main conduits to one end of said cylinder to supply pressure to cause the work to approach the spindle carrying member, a third branch conduit connecting the opposite end of said cylinder to the other of said main conduits, an adjustable constant rate valve in one of said two branch conduits, a normally open cut-off valve in the other of said two branch conduits, and piston operated means for holding said cut-off valve closed during a portion of the stroke of the piston, whereby the speed of the piston is controlled by said flow control valve during the feed portion of its stroke.

17. In a drill press having a spindle carrying member and a work supporting member mounted for relative movement, one toward and away from the other, a motor comprising a cylinder and piston for shifting one of said members, a liquid reservoir, a pump for delivering liquid from said reservoir, a valve casing having an inlet connected to said pump and an outlet connected to said reservoir, two main conduits, a shiftable valve member in said casing movable in two directions from a neutral position in which said inlet and said outlet are connected to positions connecting either of said main conduits to said inlet and the other of said main conduits to said outlet, two branch conduits connecting one of said main conduits to one end of said cylinder to supply pressure to cause the work to approach the spindle carrying member, a third branch conduit connecting the opposite end of said cylinder to the other of said main conduits, an adjustable constant rate valve in one of said two branch conduits, a normally open cut-off valve in the other of said two branch conduits, piston operated means for holding said cut-off valve closed during a portion of the stroke of the piston, whereby the speed of the piston is controlled by said flow control valve during the feed portion of its stroke, manually operable means for shifting said valve member to start, stop or reverse said motor, and piston operated means for shifting said valve member to neutral position at each end of the stroke of the piston.

18. In a drill press having a spindle carrying member and a work supporting member mounted for relative movement, one toward and away from the other, a motor comprising a cylinder and piston for shifting one of said members, a liquid reservoir, a pump for delivering liquid from said reservoir, a valve casing having an inlet connected to said pump and an outlet connected to said reservoir, two main conduits, a shiftable valve member in said casing movable in two directions from a neutral position in which said inlet and said outlet are connected to positions connecting either of said main conduits to said inlet and the other of said main conduits to said outlet, two branch conduits connecting one of said main conduits to one end of said cylinder to supply pressure to cause the work to approach the spindle carrying member, a third branch conduit connecting the opposite end of said cylinder to the other of said main conduits, an adjustable constant rate valve in one of said two branch conduits, a normally open cut-off valve in the other of said two branch conduits, piston operated means for holding said cut-off valve closed during a portion of the stroke of the piston, whereby the speed of the piston is controlled by said flow control valve during the feed portion of its stroke, manually operable means for shifting said valve member to start, stop or reverse said motor, piston operated means for shifting said valve member to neutral position at each end of the stroke of the piston, a valve unit in said third branch conduit comprising an adjustable flow retarding valve for creating a back pressure on said piston and a check valve controlled passage permitting free flow of liquid to said cylinder, and a manually operable cut-off valve in said third branch conduit for stopping said piston.

19. In a drill press having a spindle carrying member and a work supporting member mounted for relative movement, one toward and away from the other, a reversible spindle driving motor, a motor comprising a cylinder and piston for shifting one of said members, a liquid reservoir, a pump for delivering liquid from said reservoir, a valve casing having an inlet connected to said pump and an outlet connected to said reservoir, two main conduits connecting said driving motor to said casing, a shiftable valve member in said casing movable in two directions from a neutral position in which said inlet and said outlet are connected to positions connecting either of said main conduits to said inlet and the other of said main conduits to said outlet to operate the driving motor in either direction, two branch conduits connecting one of said main conduits to one end of said cylinder to supply pressure to cause the work to approach the spindle carrying member, a third branch conduit connecting the opposite end of said cylinder to the other of said main conduits, an adjustable constant rate valve in one of said two branch conduits, a normally open cut-off valve in the other of said two branch conduits, piston operated means for holding said cut-off valve closed during a portion of the stroke of the piston, whereby the speed of the piston is controlled by said flow control valve during the feed portion of its stroke, manually operable means for shifting said valve member to start, stop or reverse said motors, piston operated means for shifting said valve to motor stopping position at the ends of the piston stroke, valve means in said third conduit for retarding flow from said cylinder and permitting free flow to said cylinder, and valve means in said third conduit for closing the same to stop said piston independently of said driving motor.

20. In a machine of the character described having a shiftable carriage, a carriage shifting motor comprising a cylinder and piston, a liquid reservoir, a pump for delivering liquid from said reservoir, two main conduits connected to opposite ends of the cylinder, a control valve for connecting either of said conduits to said pump and the other to said reservoir, an adjustable constant rate flow control valve for regulating the flow from one of said conduits to the cylinder, a check valve for preventing reverse flow through said flow control valve, and a relief valve between said check valve and cylinder.

21. In a machine of the character described having a shiftable carriage, a carriage shifting motor comprising a cylinder and piston, a liquid reservoir, a pump for delivering liquid from said reservoir, two main conduits connected to opposite ends of the cylinder, a control valve for connecting either of said conduits to said pump and the other to said reservoir, an adjustable constant rate flow control valve for regulating the flow from one of said conduits to the cylinder for operating said piston in one direction, a pressure operated valve for retarding flow from the cylinder to the other of said main conduits, a check valve controlled passage by-passing said pressure operated valve and permitting free flow from said other main conduit to the cylinder when said control valve is positioned to connect the other main conduit to the pump, and check valve controlled means for by-passing said flow control valve when said other main conduit is connected to the pump.

22. In a machine of the character described having a shiftable carriage, a carriage shifting motor comprising a cylinder and piston, a liquid reservoir, a pump for delivering liquid from said reservoir, two main conduits connected to opposite ends of the cylinder, a control valve for connecting either of said conduits to said pump and the other to said reservoir, an adjustable constant rate flow control valve for regulating the flow from one of said conduits to the cylinder, an adjustable valve for retarding flow from the cylinder to the other of said main conduits, and check valve controlled means for by-passing said flow control and retarding valves when said control valve is positioned to reverse the pressure in the said main conduits.

FRANK G. ZAGAR.

REFERENCES CITED

The following references are of record in the file of this patent:

UNITED STATES PATENTS

| Number | Name | Date |
|---|---|---|
| 1,857,953 | Gough | May 10, 1932 |
| 1,861,497 | Hallenbeck | June 7, 1932 |
| 1,912,184 | Ferris et al. | May 30, 1933 |
| 2,148,348 | Groene et al. | Feb. 21, 1939 |
| 2,318,855 | Hayden | May 11, 1943 |
| 2,331,026 | Harrington | Oct. 5, 1943 |
| 2,386,341 | Pearne et al. | Oct. 9, 1945 |
| 2,424,138 | Barr | July 15, 1947 |
| 2,455,678 | Jennings | Dec. 7, 1948 |